Figure 1:
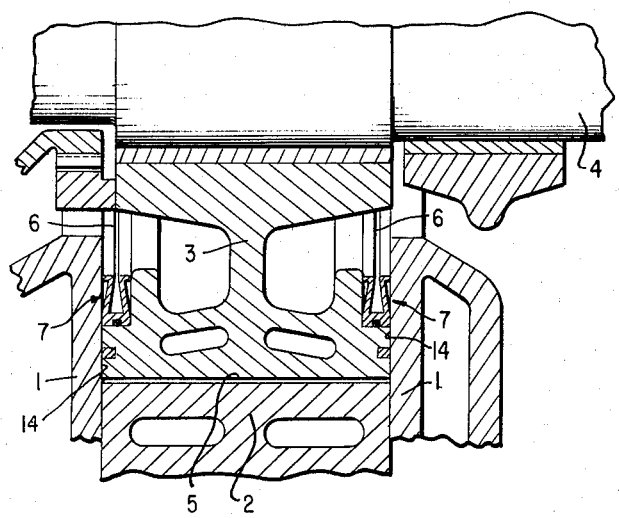

June 21, 1966  R. EHRHARDT  3,257,117

OIL SEAL AND ROTARY PISTON CONSTRUCTION

Filed June 11, 1962

INVENTOR.
RICHARD EHRHARDT

BY *Dicke and Craig*

ATTORNEYS.

# United States Patent Office 3,257,117
Patented June 21, 1966

3,257,117
OIL SEAL AND ROTARY PISTON
CONSTRUCTION
Richard Ehrhardt, Stuttgart-Unterturkheim, Germany, assignor to Daimler-Benz Aktiengesellschaft, Stuttgart-Unterturkheim, Germany
Filed June 11, 1962, Ser. No. 201,577
Claims priority, application Germany, June 14, 1961,
D 36,325
3 Claims. (Cl. 277—96)

The present invention relates to an oil seal construction between the piston end walls and the housing side walls of rotary piston internal combustion engines, especially of internal combustion engines of trochoidal construction, which consists essentially of oil-wiper rings arranged in recesses provided at the piston end walls.

The present invention is based on the problem to so construct the oil wiper rings that the spring characteristics thereof are as flat as possible and that no more space is needed for the installation of the oil wiper rings than with the conventional oil wiper rings; as solution to this problem, the present invention essentially consists of constructing the oil wiper rings approximately of U-shape in cross section and to arrange the sharp edges at the free ends of the leg portions of the U-shaped cross section. It is particularly advantageous to provide both free ends of the leg portions of each oil wiper ring with a sharp edge so that in case of wear of the one sharp edge, it is merely necessary to reverse the oil wiper ring whereby the other edge which is still sharp may be utilized for wiping the oil.

An aperture or recess may be provided on the side of the oil wiper ring web portion, which connects the leg portions thereof, opposite the leg portions which serves for the accommodation of an elastic sealing body, for example, of a rubber ring that may be accommodated therein.

Accordingly, it is an object of the present invention to provide an oil wiper ring construction for rotary piston internal combustion engines, especially of trochoidal construction, which is located between the piston end walls and the housing side walls and effectively avoids the shortcomings and drawbacks of the prior art constructions.

It is another object of the present invention to provide an oil wiper ring construction for rotary piston internal combustion engines which is so constructed and arranged as to provide a spring characteristic as flat as possible.

A further object of the present invention resides in the provision of an oil wiper rings for a rotary piston internal combustion engine which, for purposes of installation thereof, does not require a larger amount of space than the conventional oil wiper rings known heretofore.

Still another object of the present invention resides in the provision of an oil wiper ring construction for rotary piston internal combustion engines which is provided with two wiping edges adapted to be used one after the other by merely reversing the position of the oil wiper ring in the piston recess thereby considerably increasing the useful length of life of such oil wiper ring.

Figure 2:
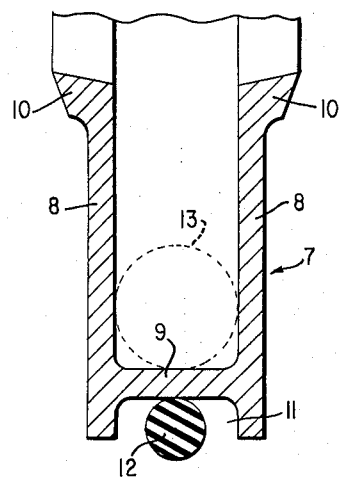

These and other objects, features and advantages of the present invention will become more obvious from the following description when taken in connection with the accompanying drawing which shows, for purposes of illustration only, one embodiment in accordance with the present invention, and wherein FIGURE 1 is a partial longitudinal cross-sectional view through a rotary-piston internal combustion engine provided with an oil wiper ring in accordance with the present invention, and FIGURE 2 is a partial cross-sectional view, on an enlarged scale, through the oil wiper ring used in FIGURE 1.

Referring now to the drawing wherein like reference numerals are used throughout the two views to designate corresponding parts, and more particularly to FIGURE 1, reference numeral 1 designates therein the side walls and reference numeral 2 the circumferential walls of the housing of the internal combustion engine. The piston 3 is rotatably arranged within this housing, constituted by the side walls 1 and the circumferential walls 2 in such a manner as to rotate eccentrically on the driven shaft 4. In order to prevent cooling and lubricating oil from reaching the working spaces which are defined or enclosed by the piston flanks 5, the housing side walls 1 and the housing circumferential walls 2, by the radially outward flow or passage of the oil between the housing side walls 1 and the piston end walls or end faces 14, oil wiper rings generally designated by reference numeral 7 are arranged within the recesses 6 provided at the piston end walls 14.

As may be seen more clearly from FIGURE 2, illustrating an oil wiper ring 7 on a larger scale, each oil wiper ring 7 has an essentially U-shaped cross section and consists of the two leg portions 8 and of a web portion 9 connecting the leg portions 8 along the radially outer ends thereof. Sharp edge portions 10 are provided at the free ends of the leg portions 8 by means of which the oil wiper ring 7, on the one hand, abuts against the piston 3, and, on the other, slides or wipes along the housing side wall 1 during operation of the internal combustion engine. The web portion 9 of the wiper ring 7 is provided with an aperture an annular recess 11 into which is inserted the rubber ring 12 during assembly of the oil wiper ring. The rubber ring 12 prevents oil from flowing around the oil wiper ring 7, and additionally assures by the frictional engagement thereof at the piston a non-rotatable support of the oil wiper ring 7 at the piston 3.

It is possible by the U-shaped construction of the oil wiper ring 7 to make very soft the springy abutment of the one sharp edge 10 at the housing side wall 1. By reason of the provision of two sharp edges, it is readily feasible to reverse, in case of need, the oil wiper ring 7 in such a manner that the one, eventually worn edge 10 is turned toward the piston 3 and the other, still sharp edge 10, that is, the edge that has not yet been worn, slides wipingly along the housing 1. If it should become necessary to increase the abutment pressure of the edge 10 sliding along the housing 1, then this can be readily achieved by the arrangement of a rubber ring 13 between the leg portions 8 which forces the leg portions 8 of the oil wiper ring 7 mutually apart.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. An oil seal arrangement between the piston end walls and the housing side walls of a rotary piston internal combustion engine, especially of an internal combustion engine of trochoidal construction, comprising a plurality of metallic oil wiper rings, annular recesses in said piston end walls, said oil wiper rings being respectively disposed in said annular recesses, said oil wiper rings each being essentially U-shaped in cross-section and comprising free leg portions connected by a web portion, each of the free ends of said free leg portions being provided with a sharp edge, one said edge being in wiping contact with a respective one of said housing side walls, means on one side of said web portion of each of said oil wiper rings defining a further annular recess, means preventing rotation of each of said wiper rings with respect to said rotary piston comprising an elastic sealing body in said further annular recess, and means for elastically wedging said leg portions of each said ring mutually apart disposed on a side of said web portion opposite to said one side, said elastic means engaging said leg portions.

2. An oil seal arrangement according to claim 1 wherein said means defining said further annular recess comprises flange members depending from said one side of said web portion.

3. An oil seal arrangement according to claim 1 wherein each of said annular recesses in said piston end walls comprises an annular wall concentric with and facing the axis of each rotary piston, said one side of said web portion of each of said rings being seated upon a respective said annular wall.

References Cited by the Examiner

UNITED STATES PATENTS

| | | | |
|---|---|---|---|
| 2,547,185 | 4/1951 | Von Bolhar | 277—207 |
| 2,824,522 | 2/1958 | Compton | 103—126 |
| 3,048,413 | 8/1962 | Wood | 277—96 |
| 3,064,880 | 11/1962 | Wankel et al. | 230—140 |
| 3,083,023 | 3/1963 | Creavey | 277—206 |
| 3,142,498 | 7/1964 | Press | 285—110 |
| 3,171,590 | 3/1965 | Bentele et al. | 123—8 |

FOREIGN PATENTS 614,140   6/1935   Germany.

LAVERNE D. GEIGER, *Primary Examiner.*

SAMUEL ROTHBERG, *Examiner.*

E. DOWNS, L. RANEY, J. MEDNICK,
*Assistant Examiners.*